W. H. MANNS.
APPARATUS FOR AND METHOD OF FILLING CANS.
APPLICATION FILED JAN. 24, 1911.
1,303,093.
Patented May 6, 1919.
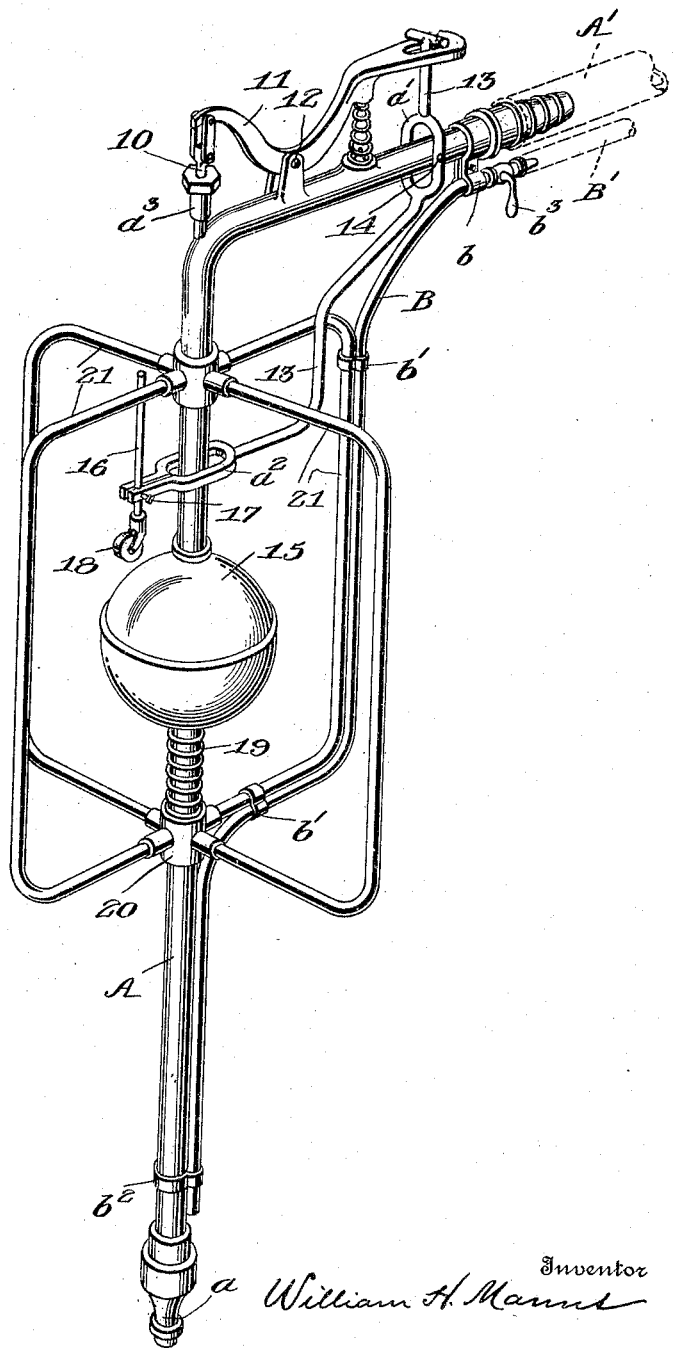

UNITED STATES PATENT OFFICE.

WILLIAM H. MANNS, OF WAYNESBORO, PENNSYLVANIA, ASSIGNOR TO FRICK COMPANY, OF WAYNESBORO, PENNSYLVANIA, A CORPORATION.

APPARATUS FOR AND METHOD OF FILLING CANS.

1,303,093.     Specification of Letters Patent.     Patented May 6, 1919.

Application filed January 24, 1911. Serial No. 604,490.

*To all whom it may concern:*

Be it known that I, WILLIAM H. MANNS, a citizen of the United States, residing at Waynesboro, in the county of Franklin and State of Pennsylvania, have invented certain new and useful Improvements in Apparatus for and Methods of Filling Cans, of which the following is a specification.

In the ordinary use of can-fillers for filling cans with water, preparatory to freezing in an ice making plant, it is necessary to warm the water to a comparatively high temperature, 65° or 70°, so that the water in the can will gradually cool itself down to the freezing point, 32°, by the time the can is filled, so that the freezing will not begin until the filling operation is concluded and an ordinary air agitating pipe inserted for the purpose of clarifying the ice, by the well known agitating process during the freezing operation.

My said invention consists in the combination with a can-filler of common, or any appropriate construction, of an air agitating pipe adapted to operate concurrently with the filler, agitating the water in the can from the time the filling begins and during the entire operation, by which means the water may be fed to the cans at a temperature close to the freezing point so that as the can fills with the water the freezing of the ice starts immediately thereby enabling the ice to be frozen in the cans in a much less time than by the ordinary process and increasing the capacity and efficiency of the plant proportionately, all as will be hereinafter more fully described and claimed.

The accompanying drawing which is made a part hereof, and on which similar reference characters indicate similar parts, shows a perspective view of my improved can-filler and agitator as ready for operation. The form of can-filler shown is one that is in common use, but it will be understood that any appropriate form may be employed.

Said can-filler comprises a filling pipe A having a nozzle $a$ on its lower end and at its upper end connected with a supply pipe A′. Its upper end is preferably bent to extend in a horizontal direction, or at right angles with the main part A. A valve (not shown) is appropriately arranged at the lower end in the casing of the nozzle $a$ and connected to a valve rod 10 by which it may be regulated. Said valve rod extends out the top through a stuffing box $a^3$ and is connected to one end of a lever 11 mounted on a pivot 12. Its other end is connected to a trip arm 13 which is mounted on pipe A on pivots 14 and the lower end of which extends to above a float 15, which is mounted to slide on the vertical part of pipe A. Said trip arm 13 is preferably formed with two loops one of which, $a'$, embraces the horizontal part of pipe A and the other of which, $a^2$, embraces the vertical part above said pipe. A rod 16 is mounted, by means of a set-screw 17, to be capable of vertical adjustment in the outer end of arm 13 and has a roller 18 on its lower end adapted to contact with float 15. The float is normally yieldingly supported on a coiled spring 19 resting on the top of a collar 20 mounted on pipe A and comprising the base of the frame 21.

It will be seen that the raising of the float 15 will operate, through its contact with roller 18 carried on the outer end of arm 13, to tilt said arm and through its connection with lever 11 operate the valve rod 10 to close the valve in the filling nozzle $a$ and shut off the flow of water when it has reached a predetermined level in the can. Said level may be readily regulated by the adjustment of rod 16 carrying the roller 18, as will be readily understood.

To the common form of can-filler thus illustrated I have attached an air agitating pipe B supported from the horizontal part of pipe A by a hanger or bracket $b$ connected to one side of the frame 21 by means of suitable clips $b'$, its lower end extending adjacent to the lower end of pipe A and to a point near the discharge nozzle $a$ thereof, where it is connected to said pipe A by means of a clip $b^2$. Its lower end is open and in its upper end it is provided with a valve controlled by a handle $b^3$ and is connected to an air supply pipe B′.

In operation, the can-filler is placed in the can to be filled in the usual way, and the supply of water to be frozen turned in through the supply pipe A′. The valve in the nozzle $a$ being normally open, the water flows into the can. Valve $b^3$ in the air pipe is at the same time opened and a supply of compressed air coming through supply pipe B′ is discharged from the lower end of pipe B into the water which is running into the can through nozzle *a*. The air thus introduced keeps the water in constant agitation and causes the bubbles to rise to the surface and permits the freezing to start immediately with satisfactory results, the ice thus frozen being clear and perfect. By this means and method ice is frozen in a much shorter space of time on account of the water being introduced at nearly the freezing temperature enabling the freezing operation to start at once and the capacity of the plant thus increased. By avoiding the introduction of water at a high temperature I also avoid unduly raising the temperature of the brine in the freezing tank and the undue expansion or evaporation of the liquid ammonia in the ammonia coils therein, thus not only increasing the efficiency and capacity of the plant, but aiding materially in the economy of its operation.

Having thus fully described my said invention, what I claim as new and desire to secure by Letters Patent, is:

1. The combination, with a can filler for ice making apparatus provided with means for supporting the same within the open end of the can and having a filling pipe with its discharge nozzle arranged to discharge near the bottom of the can, of an air agitating pipe arranged with its discharge end separate from but adjacent to the discharge nozzle of said filler pipe and adapted to discharge air simultaneously with the discharge of water from said filler pipe, substantially as set forth.

2. The process of filling cans with water preparatory to freezing into ice consisting in discharging water at a point near the bottom of the can and discharging a separate stream of compressed air at an adjacent point concurrently with the discharge of the water, substantially as set forth.

3. The method of filling cans with water preparatory to freezing to form cakes of ice which consists in discharging the water to be frozen into the can from a submerged nozzle on the lower end of a filler pipe and concurrently therewith discharging a separate stream of compressed air from the discharge end of a submerged air agitating pipe located adjacent to said filler pipe, substantially as set forth.

4. The process of making ice comprising filling the cans with water discharged from a nozzle submerged to near the bottom of the can and simultaneously discharging air from a nozzle submerged to a point near to the point of discharge for the water, substantially as set forth.

In witness whereof, I, have hereunto set my hand and seal at Waynesboro, Pennsylvania this 10th day of January, A. D. nineteen hundred and eleven.

WILLIAM H. MANNS. [L. S.]

Witnesses:
S. F. WORKMAN,
WATSON C. STONER.

Copies of this patent may be obtained for five cents each, by addressing the "Commissioner of Patents, Washington, D. C."